Dec. 4, 1962     A. G. DEAN ETAL     3,066,621
ROOF-TO-SIDEWALL CONNECTION FOR VEHICLES
Filed April 26, 1960
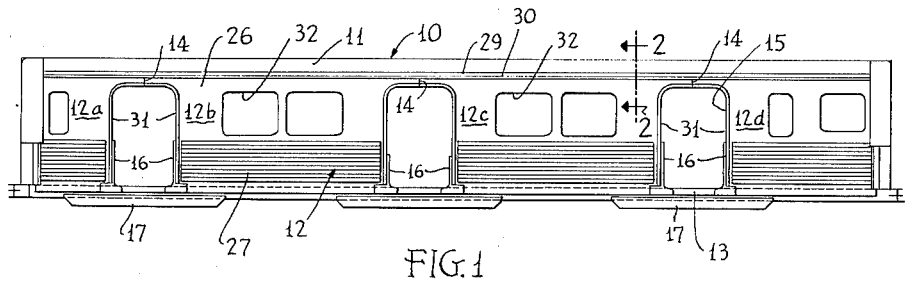
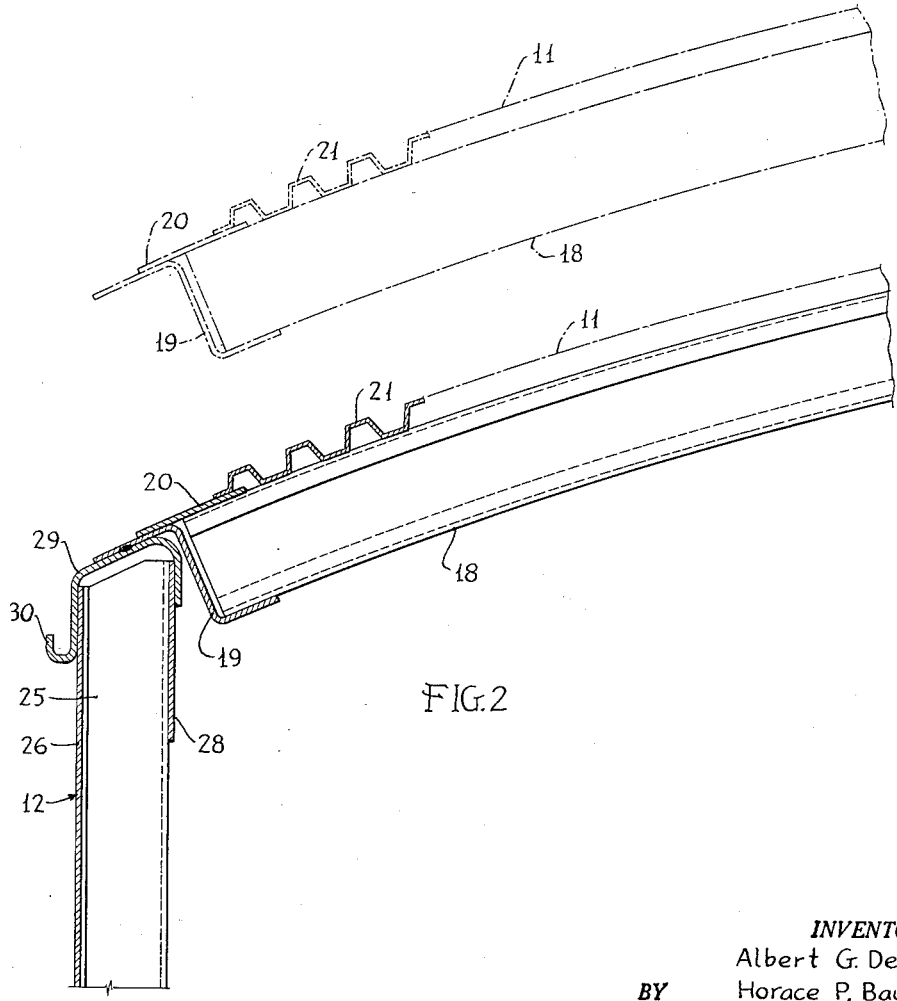
INVENTORS
Albert G. Dean
Horace P. Bauer
BY
Wm. R Glisson
ATTORNEY

United States Patent Office 3,066,621
Patented Dec. 4, 1962

3,066,621
ROOF-TO-SIDEWALL CONNECTION
FOR VEHICLES
Albert G. Dean, Narberth, and Horace P. Bauer, Huntingdon Valley, Pa., assignors to The Budd Company, Philadelphia, Pa., a corporation of Pennsylvania
Filed Apr. 26, 1960, Ser. No. 24,691
6 Claims. (Cl. 105—401)

This invention relates to roof-to-sidewall connection for vehicles, especially enclosed railway vehicles, and has for an object the provision of improvements in this art.

One of the particular objects is to provide a roof-to-sidewall connection which is strong and dependable.

Another object is to provide a connection which is easy to assemble.

Another object is to provide a connection which includes a through-running beam element which supports the side sub-assemblies so that a whole sidewall can be handled as a unit.

Another object is to provide a connection with a through-running beam which forms the gutter on the side, the gutter formation in the heavy stock of the beam greatly rigidifying and strengthening the beam.

Another object is to provide a connection which includes a thin but strong section between the roof and sidewall which will provide plate flexing movement and avoid the heavy stresses in a section-locked joint.

The above and other objects and various features of novelty will be apparent from the following description of an exemplary embodiment, reference being made to the accompanying drawings wherein:

FIG. 1 is a side elevation of an enclosed railway car embodying the invention; and FIG. 2 is a partial enlarged section taken on the line 2—2 of FIG. 1, the view in broken lines also showing the roof in pre-assembly position.

A vehicle 10, here an enclosed railway car adapted for subway passenger use, has a roof 11, sidewall 12 and floor 13.

The sidewall is made in separate sub-assemblies 12a, 12b, 12c and 12d which meet after final assembly at lines 14 above the door openings 15. The side sub-assemblies, as made, have spaced door reinforcement post elements 16 which are connected to the sidesills of the floor assembly 13 and a depending reinforcement girder element 17 is added below each door opening.

The roof assembly includes longitudinally spaced carlines 18 connected at the ends by Z-shaped beam members 19, a heavy edge plate 20 secured, as by welding, to the tops of the carlines and to the top of the Z-shaped member 19, and a longitudinally running corrugated roof covering 21. The lower inner flange of the Z-shaped member 19 is secured, as by welding, to the bottoms of the carlines. Although not shown in section, it may be noted that the carlines are of Z-section with return edge flanges.

The sidewall includes vertical posts 25, outer panel covering 26, corrugated covering 27, an inner top plate 28, and the heavy top through-running U-J beam 29 which carries the gutter 30. Each sub-assembly carries half a door frame 31 and the door reinforcement 16. There are window openings 32 suitably framed.

After the side sub-assemblies have been made they are all connected by the heavy through-running U-J section top beam 29 and the whole side is lifted by crane to the floor assembly and secured to it. There is good access for welding tools at windows and doors for attaching the depending flanges of the top beam to the posts and panels of the sidewall.

The roof assembly is then positioned and the outer top flange of the Z-shaped beam 19 is welded to the sloping top web of the beam 29. The plate 20 may also be welded into the pile-up at the upper edge.

A slight space is left between the web of the Z-shaped member 19 and the side of member 29 so that there is a bendable length between roof and sidewall comprising the thickness of the plate 20 and the top flange of the Z-shaped member 19. The top joint, of course, will be sealed to exclude weather. Resistance or arc welding may be used as suited for the connections to be made. Stainless steel is the preferred metal for all parts.

It is seen that the invention provides a very dependable durable connection which is easy to assemble.

While one embodiment has been described for purposes of illustration it is to be understood that there may be various embodiments and modifications within the scope of the invention.

What is claimed is:

1. A roof-to-sidewall connection for vehicles having roof carlines flexibly connected to sidewall posts, comprising in combination, a U-section secured as a cap to the sidewall posts, a flexible Z-section having upper and lower flange sections and an intermediate web section extending the length of the vehicle, a top plate connected to said upper flange of said Z-section to form a second U-section with the web and lower flange of said Z-section, said second U-section being secured as a cap to the roof carlines, and a weld connection securing an end portion of said upper flange of said Z-section to said U-section, whereby said roof carlines are flexibly connected through said upper flange of said Z-section to said sidewall posts.

2. A roof-to-sidewall connection for vehicles having roof carlines flexibly connected to sidewall posts, comprising in combination, a U-J-section secured to the sidewall posts at the U-section for rigidifying the sidewall posts and providing a gutter for the car roof, a flexible Z-section extending the length of the vehicle having a vertical web section and substantially flat upper and lower flange sections for connection to the U-J-section and the roof carlines, a portion of said upper flange Z-section being connected to and overlapping the top of said U-J-section, the remaining portion of said upper flange Z-section being freely suspended between said U-J-section and said roof carlines to provide a flexible connection portion, said lower flange Z-section being connected to the bottom of the roof carlines, and a top plate connected to the top of the roof carlines and to the flexible portion of said Z-section for rigidifying said vertical web of the Z-section without rigidifying the flexible portion of the upper flange of the Z-section.

3. A flexible roof-to-sidewall connection for a vehicle having roof carlines and sidewall posts, comprising in combination, a Z-section beam extending the length of the vehicle having its lower inner flange secured to the lower side of the carlines, a top plate secured to the top side of the carlines and to the top flange of the Z-section beam, an inverted U-section secured over the upper end of said posts, and said top plate and top flange of the Z-section beam being secured to the top web of the U-section beam so as to provide a freely suspended portion of said top plate and said top flange of the Z-section as a connector portion between the roof carlines and the sidewall.

4. A connection as set forth in claim 3, wherein said U-section further includes a J portion beam forming a gutter for the car roof.

5. A connection as set forth in claim 3, which further includes an outer sidewall sub-assembly connected along the full length of the posts beneath the outer portion of said U-section beam.

6. A connection as set forth in claim 3, in which the doubled top plate and top flange of the Z-section beam are sealed by an intermediate sealer means to form a weather tight thin section bridge between the roof and sidewall.

References Cited in the file of this patent

UNITED STATES PATENTS

| | | |
|---|---|---|
| 1,315,757 | Bonsall et al. | Sept. 9, 1919 |
| 2,036,555 | Thompson et al. | Apr. 7, 1936 |